Figure 1:
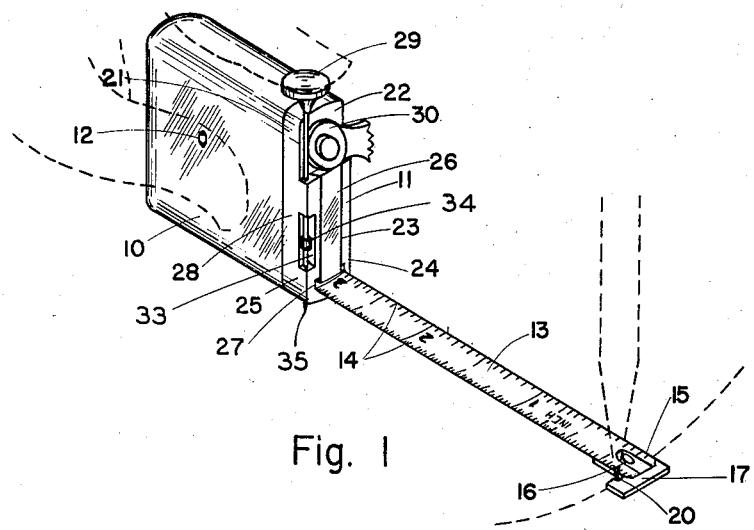

Sept. 29, 1959  H. A. SMITH  2,906,024
BEAM COMPASSES
Filed March 11, 1957

INVENTOR
HAROLD A. SMITH

BY *Vernon S. Grinstead*

ATTORNEY

United States Patent Office 2,906,024
Patented Sept. 29, 1959

2,906,024

BEAM COMPASSES

Harold A. Smith, St. Paul, Minn.

Application March 11, 1957, Serial No. 645,294

5 Claims. (Cl. 33—27)

My invention relates to improvements in beam compasses. It is an object of my invention to provide a beam compass which is relatively inexpensive and easy to manufacture.

It is another object to provide a beam compass having a minimum number of components, which is easy to assemble, and of a simplified construction.

It is a further object to provide a multi-purpose beam compass which is very compact in construction and which can be easily carried. My improved beam compass contains simplified means for adjustment and is extremely easy to operate.

Yet a further object is to provide a beam compass with a maximum range of adjustment to permit the scribing of circles or arcs having either a small or large radius. My beam compass can also be used to duplicate linear measurements and to duplicate dimensions by simply setting the device at the desired dimensions and marking off the required number of measured sections. With my device it is unnecessary for the operator to pre-assemble the beam compass in the manner normally required for existing devices.

Another object of my invention is the provision of a beam compass in combination with a flexible rule, which device can be employed in the scribing of arcs and circles but which retains its basic utility as a scale.

I am familiar with the presently existing compasses and other similar devices; however, these contain numerous disadvantages which are avoided by my invention. One form of a commonly known beam compass consists of a scribe, a pivot pin and attachable cylindrical bars of variable lengths. The scribe and the pivot pin are slidable on the rods and adjustable to the desired radius. The disadvantage of this type of device is that it requires pre-assembly by the operator immediately prior to use. Furthermore, another disadvantage resides in the absence of a scale, thereby requiring the operator to obtain the desired radius only by reference to a separate scale. In addition, this type of device requires complex packaging, is cumbersome to carry, and expensive to manufacture.

Other attempts have been made to provide a beam compass in cooperation with a flexible scale. However, these known devices also have many disadvantages not found in my device. For example, those with which I am familiar are very complex and cumbersome. Furthermore, they require complex adjustment mechanisms and as a consequence, the device tends to become objectionably large in size. A further disadvantage found in existing devices is that they require the operator to employ both hands when the compass is being adjusted to the desired radius and the setting of the compass fixed.

As has been shown, the pre-assembly step in presently existing compasses is a difficult task for the operator, and the assembly process requires the expenditure of a considerable amount of time. In addition, the existing devices have but a limited range of adjustment and are not readily adaptable to the several uses for which my device may be utilized. Further, present beam compasses have a high manufacturing cost and consequently a high initial investment is required for the purchase of the unit.

It is an object of my invention to provide a beam compass having a broad range of uses and which can be utilized by a large number of individuals such as engineers, carpenters, metal smiths and housewives. In fact, because of the inexpensive construction, the device can be made available to anyone who has occasion to make measurements, scribe circles, or perform any of the functions to which the device can be adapted.

Figures 2, 3, 4:
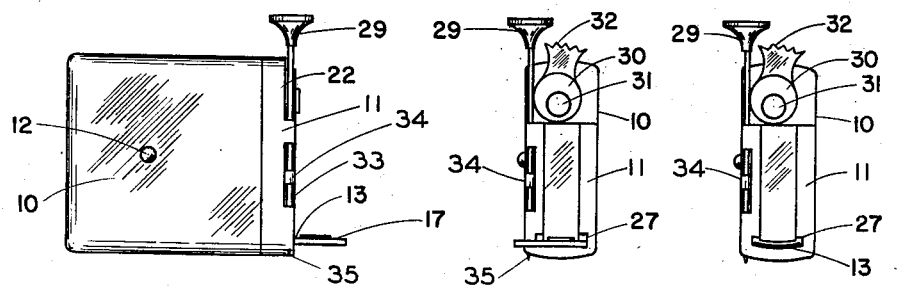
Figure 5:
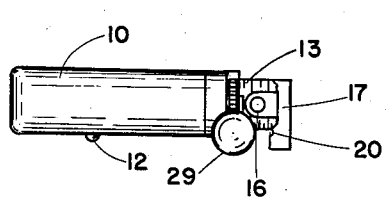
Figure 6:
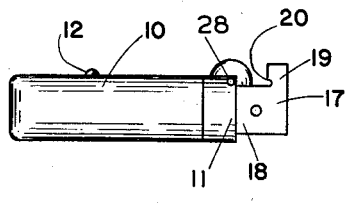

Figure 1 is a perspective view of my beam compass, showing a dotted line illustration of the operation of the device, Figure 2 is a side view thereof, Figure 3 is an end view thereof, Figure 4 is an end view with the scribe guide removed, Figure 5 is a top view, and Figure 6 is a bottom view.

My device consists of the case 10 which is, for purposes of illustration, shown to be of a generally rectangular shape. For purposes of illustration, I will describe my invention with reference to a single type of construction, but it should be understood that a different case construction could be employed without departing from the spirit of the invention. The case may be of one-piece construction and formed of plastic or metal with two enlarged side walls, a pair of narrower top and bottom walls, and an end wall, thereby leaving an open end. Fitted into the remaining open end is the tape holding member which may be formed integrally with the end closure member.

The tape holding member, not shown, can be formed as a single wall unit having a stud or boss formed thereon, on to which is wound a retracting spring member. The end wall 11 may be formed integrally with the tape holding member and the entire unit retained within the case 10 by means of a screw 12. The screw 12 fits through an aperture in the case 10 and is threaded into the boss or stud formed integrally with the spring-holding member. The rule or scale 13 is attached at its innermost end to the spring member and is biased inwardly by the retracting spring.

The tape 13, which is flexible yet resilient, is wound upon itself and retained within the casing 10 when not in use. As stated, the tape 13 is biased in an inwardly direction by means of the retracting spring which is attached to the innermost end of the tape 13. Suitable scale division markings 14 are formed upon or imprinted upon the upper surface of the tape 13. Normally, the tape 13 is formed so as to be slightly concave in its width as illustrated in Figure 4. Attached to the outermost end 15 of the tape 13, by means of a rivet 16, is the scribe or pencil guide 17. The scribe or pencil guide 17 is formed with a neck portion 18 having a width coextensive with that of the tape 13. The neck portion 18 is of reduced thickness thereby providing a shoulder which is engageable wtih the end of the tape to prevent rotation of the pencil guide 17 relative to the tape. The end portion of the scribe or pencil guide 17 is formed with an elongated member 19 thereon which extends transversely beyond the tape. The portion 19 is formed with an indentation 20 therein to provide a positioning means for the scribe or pencil used with the device. The indentation 20 is preferably formed in a semi-circular shape so as to conform substantially to the scribes or pencils which will be employed. It will be noted that the indentation 20 is located on the same side of the tape as the pivot pin 21 and in axial alignment therewith. Positioning the scribe guide indentation 20 in alignment with the pivot pin 21 provides for accurate selection of the desired radius, and the indentation is positioned from the end of the rule so as to compensate for the offset of the pivot pin 21 inwardly from the outward end of the slidable brake 26.

As best illustrated in Figure 1, the end member 11 is formed with a top portion 22 of reduced thickness. The bottom section 23 of the end member 11 is formed with retaining members 25 and 24. The inward edges of the retaining members 24 and 25 are disposed at an angle inwardly toward the case and outwardly toward the edges of the case as shown in Figure 1. This construction provides a groove in which the slidable brake or clamp 26, which has upwardly and inwardly inclined outer walls corresponding to the angular construction of the retaining members 24 and 25, is movable. If it is formed integrally with the spring retaining member, the end member 11 may be attached to the case by means of the screw 12. Other means for attaching the end member 11 to the casing may of course, be utilized. The slidable brake 26 is formed with a convex bottom end which conforms to the convex construction of the tape and thereby provides for close frictional engagement therewith and thereby prevents the bending or distortion of the tape. A variation in the form of construction of the end member would provide that a slidable brake such as 26 is retained on the end member 11 by means of rivets fitted through elongated slots in the slidable brake 26 to enable the required movement into engagement with the tape 13 to lock the tape in its desired position.

The end member 11 is formed with an aperture 27 therein through which the tape 13 is slidable. The lowermost surface of the end member 11, at the aperture 27, is also concave to conform with the tape 13. This is best illustrated in Figure 4. The slidable brake 26 extends, at its lowermost end, into the aperture 27 and comes into contact with the tape at the aperture 27. The lower surface of the aperture 27 engages the bottom surface of the tape 13 whereas the lowermost surface of the sliding brake 26 is engageable with the top surface of the tape 13 in the manner hereinafter described. The retaining member 25 is formed with a cylindrical opening 28 therein through which is movably fitted the pivot member 21. Suitable retaining means are provided to hold the pivot pin 21 within the cylindrical opening 28. This retaining means may take the form of a shoulder member springably supported in a portion of the pivot pin 21 of reduced diameter.

In the form illustrated the retaining member 25 is formed with an indentation or recess 33 intermediate its ends. The pivot pin 21 is fitted through the upper portion of the cylindrical opening 28, then through the indentation or recess 33 and finally through the lower portion of the cylindrical opening 28. When thus disposed the pivot pin 21 is in an operating position. To retain the pivot pin 21 in an operable position and yet provide for limited vertical movement of the pivot pin 21 relative to the scale, a bushing 34 is fixedly attached to the pivot member at a point intermediate the portion exposed within recess 33.

The pivot pin 21 might also be formed with an enlarged diameter near the upper end thereof having an annular shoulder engageable with a suitable retaining ring which is attached to the upper portion 22 of the end member 11.

The pivot pin 21 has formed thereon, at the upper end thereof, a finger engaging member 29 of a conical shape. The upper surface of the finger engaging member is preferably formed with a concave depression therein to provide for more positive engagement with the finger of the operator. The bottom portion of the pivot member 21 is formed with a pointer 35 of reduced diameter and suitably sharp to provide an axis for the circle to be drawn.

To protect the point 35 of the pivot member 21 and prevent damage thereto, the pivot member point 35 will be contained entirely within the retaining member 25 when not in use. The pivot pin 21 may be retained in this position by rotating the cam 30 into the position shown in Figures 3 and 4 so that the cam engages with a portion of the pivot pin 21 and thereby retains it in a fixed position.

To set the slidable brake at the desired radius, the scale 13 is withdrawn to the proper scale indicia 14 and the cam 30 rotated in a clockwise direction. The cam 30 is rotatably connected to the upper end 22 of the end member 11 by means of a shoulder stud, screw, or rivet 31 which extends through an aperture positioned below the center of the circular portion of the cam 30. This mounting arrangement provides an eccentric, whereby the cam engages with the uppermost end surface of the slidable brake 26 and forces it downwardly into engagement with the tape. To facilitate the rotation of the cam, I provide an integrally formed cam extension arm 32 having a knurled serrated outer edge. This cam extension or lever arm 32 will be disposed in an upright or vertical position when the cam 30 is at the point of minimum engagement with the slidable brake 26. The serration provided on the cam extension arm 32 will facilitate finger operation of the cam. It will be seen that as the cam is rotated in a clockwise direction, the slidable brake 26 is forced downwardly into engagement with the tape 13. This forces the tape 13 into frictional engagement with the lower surface of the aperture 27 and prevents the tape from being drawn into or out of the case. To adjust the setting of the radius, it is only necessary to rotate the cam 30 in a counter-clockwise direction, thereby freeing the sliding brake 26 and permitting the free movement of the tape 13. As has been previously mentioned, by rotating the cam 30 in a counter-clockwise direction, into the position shown in Figures 3 and 4, one surface thereof will be brought into contact with the pivot pin 21 and this frictional engagement will retain the pivot pin in any desired position.

It will be apparent that the cam 30 may be made in any suitable form and the cam extension 32 may be replaced by knurling on the edge of the cam.

To operate my device, it is merely necessary to place the finger upon the enlarged concave head 29 of the pivot pin 21 to bring the center point 35 into engagement with the paper or metal on which the arc is to be drawn. The rule or scale 13 is then withdrawn from the case 10 to the desired radius and the cam 30 rotated in a clockwise direction to move the brake 26 into engagement with the tape. The user or operator then fits a pencil or scribe into the guide member 17 and draws a circle as the scale and case rotate about the pivot pin 21. To release the rule back into the case, the cam 30 is rotated in counter-clockwise direction and the retracting spring will tend to draw the scale 13 back into the case 10.

It will be apparent that this compact construction and easy operation will provide a beam compass having many applications in varied fields of employment. The device is compact and can be carried in the pocket of the user quite conveniently. Therefore, it is readily available for use and need not be assembled prior to using. Being attached to the scale, or used in conjunction therewith, no separate scale is necessary to adjust the compass to the desired radius. Furthermore, no elaborate packaging is necessary, for the device contains self-protective features which obviate expensive packaging. It will be seen that the device can be produced in quantity at a low cost and marketed as a relatively inexpensive item.

I claim:

1. A beam compass comprising a hollow casing having an open end, a closure member for the open end of said casing, an independently readable resilient scale wound within said casing and extendible therefrom, a compass pivot member disposed adjacent one edge of said scale having a pointed bottom end and an enlarged concave head end, support means formed on said closure member to rotatably contain said compass pivot member, brake means slidable on said closure member frictionally engageable with said resilient scale to adjustably hold said scale in a selected position of extension, eccentric cam means rotatably cooperable with said brake means to maintain said brake means in engagement with said scale, and scribe guide means attached to the outermost end of said scale having an arcuate indentation formed therein in alignment with the pointed end of said pivot member.

2. A beam compass having a hollow rectangular housing with one open end, an end closure member having an arcuate transverse aperture formed therein at the lower end thereof, means for affixing said end closure member in the open end of said housing, a direct measurement resilient scale extensible from said housing through the aperture in said end closure member, a vertically disposed brake member slidable over a portion of said end closure member, outwardly disposed retaining walls formed on the lower portion of said end closure member defining a slot in which said brake member is slidable, eccentric cam means engageable with the uppermost end of said brake member revolvably attached to the upper portion of said end closure member, a cam extension lever arm formed integral with said cam means rotatable pivot pin means supported in a cylindrical opening in one of said retaining walls formed on said end closure, an enlarged concave head member formed on the upper end of said pivot pin, and a scribe guide affixed to the outwardly extending end of said resilient scale.

3. In a simplified beam compass a substantially rectangular hollow casing having one open end, an independently usable upwardly concave resilient scale coiled within said casing and adjustably withdrawable therefrom, a closure member attachable to said casing at the open end thereof, a pair of upstanding walls formed integrally with said closure member at the lower end thereof, said walls defining a grooved slot therebetween having outwardly converging opposed faces, a slidable brake having outwardly converging side faces retained between said upstanding walls, the lowermost end of said slidable brake conformable to the concave surface of said scale and engageable therewith, cam means attached to said closure member engageable along its cam surface with the uppermost end surface of said slidable brake to force said brake into frictional engagement with said scale thereby preventing relative movement thereof, a cylindrical pivot member having a pointed lower end movably attached to said closure member adjacent said brake, and guide means affixed to the outermost end of said scale to releasably retain a scribing instrument in a fixed position relative to said pivot member.

4. A beam compass comprising a hollow outer cover having one open end, a closure member for the open end of said outer cover, an independently usable coilable scale extendable from said cover, a rotatable pivot pin retractably supported in an exposed operative position by said closure member adjacent one edge of said scale, vertically slidable clamp means positioned adjacent said pivot pin, rotatable eccentric cam means engageable with said clamp means to urge said clamp means into frictional contact with said scale and retain said scale in a predetermined position of extension, and scribe guide means affixed to the outermost end of said scale in alignment with said pivot pin.

5. In a beam compass, a casing having one open end, end closure means for said casing having an aperture formed therein, an independently usable direct reading flexible scale coilable into said casing through the aperture therein, a rotatable pivot pin retractably contained within said end closure means and movable outwardly into an operatively exposed position adjacent one edge of said scale, cooperable eccentric cam and slidable brake means engageable with said scale to retain said scale in the desired position of extension, and scribe guide means affixed to the outermost end of said scale alignable with said pivot pin.

References Cited in the file of this patent

UNITED STATES PATENTS

| Number | Name | Date |
|---|---|---|
| 302,315 | Bellamy | July 22, 1884 |
| 588,129 | Clough | Aug. 17, 1897 |
| 671,690 | Creasy | Apr. 9, 1901 |
| 831,055 | Gilmore | Sept. 18, 1906 |
| 1,259,886 | McLeod | Mar. 19, 1918 |
| 1,447,207 | Golden | Mar. 6, 1923 |
| 2,349,670 | Moxey | May 23, 1944 |
| 2,400,343 | Eskil | May 14, 1946 |
| 2,446,020 | Nicholson | July 27, 1948 |
| 2,581,858 | Hilt et al. | Jan. 8, 1952 |
| 2,624,120 | Mills | Jan. 6, 1953 |
| 2,804,688 | Kultner | Sept. 3, 1957 |